(12) United States Patent
Fujisawa

(10) Patent No.: US 7,784,068 B2
(45) Date of Patent: Aug. 24, 2010

(54) DISK DEVICE

(75) Inventor: Shinichi Fujisawa, Akiruno (JP)

(73) Assignee: TEAC Corporation, Tokyo (JP)

( * ) Notice: Subject to any disclaimer, the term of this patent is extended or adjusted under 35 U.S.C. 154(b) by 566 days.

(21) Appl. No.: 11/773,941

(22) Filed: Jul. 5, 2007

(65) Prior Publication Data

US 2008/0010650 A1     Jan. 10, 2008

(30) Foreign Application Priority Data

Jul. 6, 2006  (JP) .............................. 2006-186866

(51) Int. Cl.
*G11B 17/04* (2006.01)
(52) U.S. Cl. ...................................... 720/636
(58) Field of Classification Search ................ None
See application file for complete search history.

(56) References Cited

U.S. PATENT DOCUMENTS

| | | | |
|---|---|---|---|
| 6,487,159 B1 * | 11/2002 | Hamada | 720/632 |
| 6,654,334 B1 | 11/2003 | Yamashita | |
| 6,934,957 B2 * | 8/2005 | Kanada et al. | 720/638 |
| 7,284,248 B2 * | 10/2007 | Nishida et al. | 720/600 |
| 7,325,242 B2 * | 1/2008 | Yokota | 720/609 |
| 7,353,522 B2 * | 4/2008 | Suzuki | 720/621 |
| 7,356,825 B2 * | 4/2008 | Makisaka et al. | 720/626 |
| 2004/0223420 A1 | 11/2004 | Yokota | |
| 2006/0230412 A1 | 10/2006 | Fujisawa | |

FOREIGN PATENT DOCUMENTS

| | | |
|---|---|---|
| JP | 4023252 A | 1/1992 |
| JP | 8297887 A | 11/1996 |
| JP | 9330542 A | 12/1997 |
| JP | 2004348814 A | 12/2004 |
| WO | 2005101401 A1 | 10/2005 |

OTHER PUBLICATIONS

Notification of Reasons for Refusal drafted Apr. 8, 2010, for Japanese Application No. 2006-186866, 3 pages + 2 pages English translation.

* cited by examiner

*Primary Examiner*—Mark Blouin
(74) *Attorney, Agent, or Firm*—Seed IP Law Group PLLC

(57) ABSTRACT

A disk transport mechanism in a disk drive is connected with a transmission gear mechanism. A loading motor drives the disk transport mechanism. When the loading motor rotates forwards, an optical disk is carried by the disk transport mechanism to a chuck position. When the loading motor rotates backwards, the optical disk is moved back to an ejection position. In failure of the loading motor, an emergency pin is pushed to actuate an emergency disk ejector. A first gear wheel in the transmission gear mechanism is disengaged by the emergency disk ejector to separate the transmission gear mechanism into a disk transport mechanism side and a motor. A second gear wheel on the disk transport mechanism side is rotated to actuate the disk transport mechanism. The emergency pin is pushed repeatedly to cause the disk transport mechanism to move back the optical disk to the ejection position.

16 Claims, 14 Drawing Sheets

DISK DEVICE

BACKGROUND OF THE INVENTION

1. Field of the Invention

The present invention relates to a disk device for driving a disk. More particularly, the present invention relates to a disk device for driving a disk, the disk device having a mechanism for disk ejection in a forcible manner.

2. Description Related to the Prior Art

An optical disk is an information recording medium for use in a computer system or other electronic equipment for storing information of a considerable amount, for example, CD-R/RW, DVD-R/-RW/RAM/+R/+RW. An optical disk drive or player as optical disk device is loaded with the optical disk, and accesses the optical disk to write information to or read information from the optical disk. One of two well-known types of the optical disk drives is a tray type. The tray type includes a disk tray, which is movable between a contained position and an ejection position, and when in the contained position, is contained in a case chassis, and when in the ejection position, protrudes from the case chassis. When the optical disk is set on the disk tray in the election position, the disk tray is entered in the optical disk drive, by manual pressure and then by a motor. The optical disk is set in a chuck position by the disk tray, and is clamped on and driven by the turntable and a chuck head. The pickup head writes or read information to the disk while the disk is driven. When an ejection button is depressed later, the disk tray moves out to the ejection position.

In a slot-in type of optical disk drive, no disk tray is used. It is possible structurally to reduce a thickness and size of the optical disk drive with advantages for use in personal computer or other electronic apparatuses. To load the slot-in type with an optical disk, a user enters a first half of the optical disk through an insertion slot formed in a front bezel of the optical disk drive. In response to the entry through the insertion slot, a loading mechanism is started and advances the disk inclusive of the second half automatically into the optical disk drive.

In any of the tray type and the slot-in type, an ejection button is depressed for ejection of a disk for the purpose of unloading the disk from the optical disk drive. In response to depression of the ejection button, a motor rotates in a backward direction, for carrying out unloading of the disk. Should failure occur according to disconnection of a power source or mechanical failure of the optical disk drive itself, no automatic ejection of the disk can be made. The disk remains in the optical disk drive.

The state of unwanted presence of the disk in the optical disk drive is a serious problem. For the purpose of emergency, an emergency disk ejector is incorporated in the optical disk drive. U.S. Pat. No. 6,654,334 (corresponding to JP-B 3772667) discloses an emergency disk ejector in which a manual driving structure is inserted to push at plural times to rotate a gear intermittently. The gear rotates a loading arm to eject a disk.

In FIG. 16, the emergency disk ejector of U.S. Pat. No. 6,654,334 is illustrated. An ejection slider 100 is a manually operable member. A rack gear 104 is formed on the ejection slider 100. A tension coil spring 101 biases the ejection slider 100 in a direction toward the right in the drawing. A gear unit 103 is not meshed with the rack gear 104. When the ejection slider 100 slides to the left in a range of guide slots 105*a* and 105*b*, the rack gear 104 becomes meshed with the gear unit 103.

When the ejection slider 100 is pushed by an emergency pin P as external device, the rack gear 104 causes the gear unit 103 to rotate. The rotation of the gear unit 103 makes it possible to eject a disk forcibly. A worm gear 106 of an output shaft of a motor 102 is meshed with the gear unit 103. Load at the time of the backward rotation of the gear unit 103 is considerably high. Manual operation of the ejection slider 100 requires great force. Mechanical stress in the ejection slider 100 is very high.

SUMMARY OF THE INVENTION

In view of the foregoing problems, an object of the present invention is to provide a disk device for driving a disk, the disk device having a mechanism for disk ejection in a forcible manner, and being manually operable with great ease by reduction of load required for forcible ejection of the disk.

In order to achieve the above and other objects and advantages of this invention, a disk device has a disk transport mechanism for loading of a disk and moving the disk to a chuck position when a loading motor rotates forwards, and for unloading and moving the disk to an ejection position when the loading motor rotates backwards. The disk device includes a transmission gear mechanism for transmitting rotation of the loading motor to the disk transport mechanism, the transmission gear mechanism including plural gear wheels. A specific disk ejector is operated by push of an external device, for separating the transmission gear mechanism into a first component on a disk transport mechanism side and a second component on a side of the loading motor by shifting a first gear wheel of the transmission gear mechanism from a meshed position to a disengaged position, and for rotating a second gear wheel included in the first component on the disk transport mechanism side in a first direction, to actuate the disk transport mechanism for unloading the disk.

The specific disk ejector shifts the first gear wheel to the disengaged position in an initial step of the push of the external device, and then causes the second gear wheel to rotate at a predetermined amount. The specific disk ejector actuates the disk transport mechanism intermittently by the push of the external device at plural times, to move back the disk to the ejection position. Furthermore, a biasing member moves the specific disk ejector to an initial position when the push of the external device discontinues. The specific disk ejector further prevents the second gear wheel from rotating in a second direction reverse to the first direction in moving back to the initial position. Prevention of the second gear wheel from rotating in the second direction is substantially simultaneous with shift of the first gear wheel to the disengaged position.

The disk transport mechanism includes a loading slider moved back and forth substantially rectilinearly by the transmission gear mechanism. Plural arms support the disk, move pivotally, move the disk to the chuck position when the loading slider moves forwards, and move the disk back to the ejection position when the loading slider moves backwards.

The specific disk ejector includes a driving structure for moving from a first position to a third position bypassing a second position upon the push of the external device, and a first biasing member for biasing the driving structure toward the first position. The driving structure includes a step portion for shifting the first gear wheel between the meshed position and the disengaged position, for keeping the first gear wheel in the meshed position when the driving structure is in the first position, and for releasing and allowing the first gear wheel to shift to the disengaged position while the driving structure moves from the first position to the second position. A rack gear is engageable with the second gear wheel, for mesh with the second gear wheel to rotate the second gear wheel in the first direction when the driving structure moves from the second position to the third position, and for disengagement from the second gear wheel when the driving structure moves back from the third position to the second position. The step portion includes a tilted surface for shifting the first gear wheel gradually to the meshed position when the driving structure moves back from the second position to the first position.

The driving structure further includes a slot for receiving insertion of a stationary pin, the slot keeps the driving structure movable between the first and third positions, and keeps the driving structure pivotally movable for releasing the rack gear from mesh with the second gear wheel in moving back from the third position to the second position.

Each of teeth of the rack gear includes a first tooth surface, being erect, for rotating the second gear wheel in the first direction when the driving structure moves from the second position to the third position. A second tooth surface is tilted, for facilitating passage of a tooth tip of the second gear wheel when the driving structure moves back from the third position to the second position.

The specific disk ejector further includes a follower, driven by the driving structure to move between a latched position and a released position, for moving to the latched position while the driving structure moves from the first position to the second position, and for moving to the released position while the driving structure moves back from the second position to the first position, wherein the follower, when in the latched position, allows the second gear wheel to rotate in the first direction, and disables the second gear wheel from rotating in the second direction. A second biasing member biases the follower toward the released position, the second biasing member having smaller force of bias than the first biasing member.

The follower further includes a latch arm having resiliency. A latch claw is formed at an end of the latch arm, for engagement with a tooth of the third gear wheel included in the first component on the disk transport mechanism side when in the latched position, wherein the latch claw, when the second gear wheel rotates in the first direction, is moved away from the tooth of the third gear wheel by resilient deformation of the latch arm, and when rotational force to the second gear wheel is exerted in the second direction, comes in mesh with the third gear wheel. The follower further includes a wedge block for pressing and shifting the first gear wheel to the disengaged position in a state free from the step portion of the driving structure when the follower moves from the released position to the latched position. The driving structure includes a projection, and the follower has a ridge pressed by the projection, and the follower is caused by the projection and the ridge to move between the latched position and the released position upon movement of the driving structure.

In a preferred embodiment, a disk device has a disk transport mechanism for loading of a disk and moving the disk to a chuck position when a loading motor rotates forwards, and for unloading and moving the disk to an ejection position when the loading motor rotates backwards. The disk device includes a transmission gear mechanism for transmitting rotation of the loading motor to the disk transport mechanism by constituting a transmission system. A specific disk ejector is operated by push of an external device, for separating the transmission system into a first component on a disk transport mechanism side and a second component on a side of the loading motor, and for driving the first component to actuate the disk transport mechanism for unloading the disk.

Accordingly, it is possible to reduce load required for forcible ejection of a disk because the gear in the transmission gear mechanism is disengaged for the purpose of emergency ejection of the disk upon push of an external device or emergency pin. Operation for the push of the external device is facilitated. There is no mechanical stress because of the state free from forcibly rotating the transmission gear mechanism. Furthermore, it is possible in the type of repeated push of the external device or emergency pin for the ejection to eject a disk in a completed stopped state even upon the push during a high speed rotation of the disk. Thus, it is possible to unload and withdraw the disk safely.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
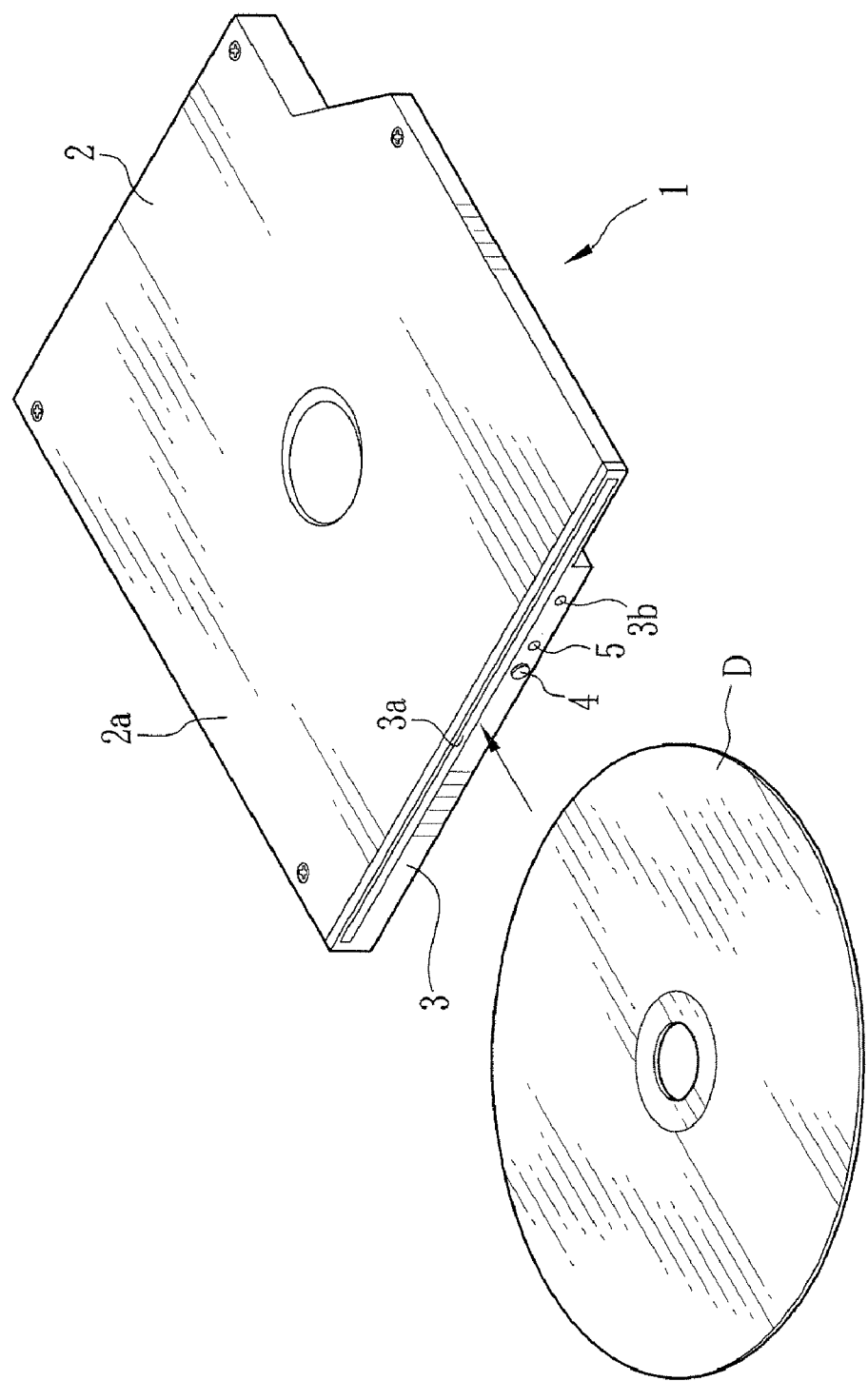
FIG. 1 is a perspective view illustrating an optical disk drive of a slot-in type according to the invention.

In FIG. 1, an optical disk drive 1 or player as optical disk device has a case chassis 2 constructed in a shielded state. A front bezel 3 is fitted on the case chassis 2. An insertion slot 3a is formed in the front bezel 3 for insertion of an optical disk D. An emergency hole 3b is formed in the front bezel 3 for emergency ejection of the disk D in a forcible manner. An ejection button 4 and a loading indicator 5 are disposed on the front bezel 3. The ejection button 4 is depressed for ejection of the optical disk D. The loading indicator 5 illuminates to indicate a status of operation of the optical disk drive 1. An upper panel 2a of the case chassis 2 is constructed removably.

Figure 2:
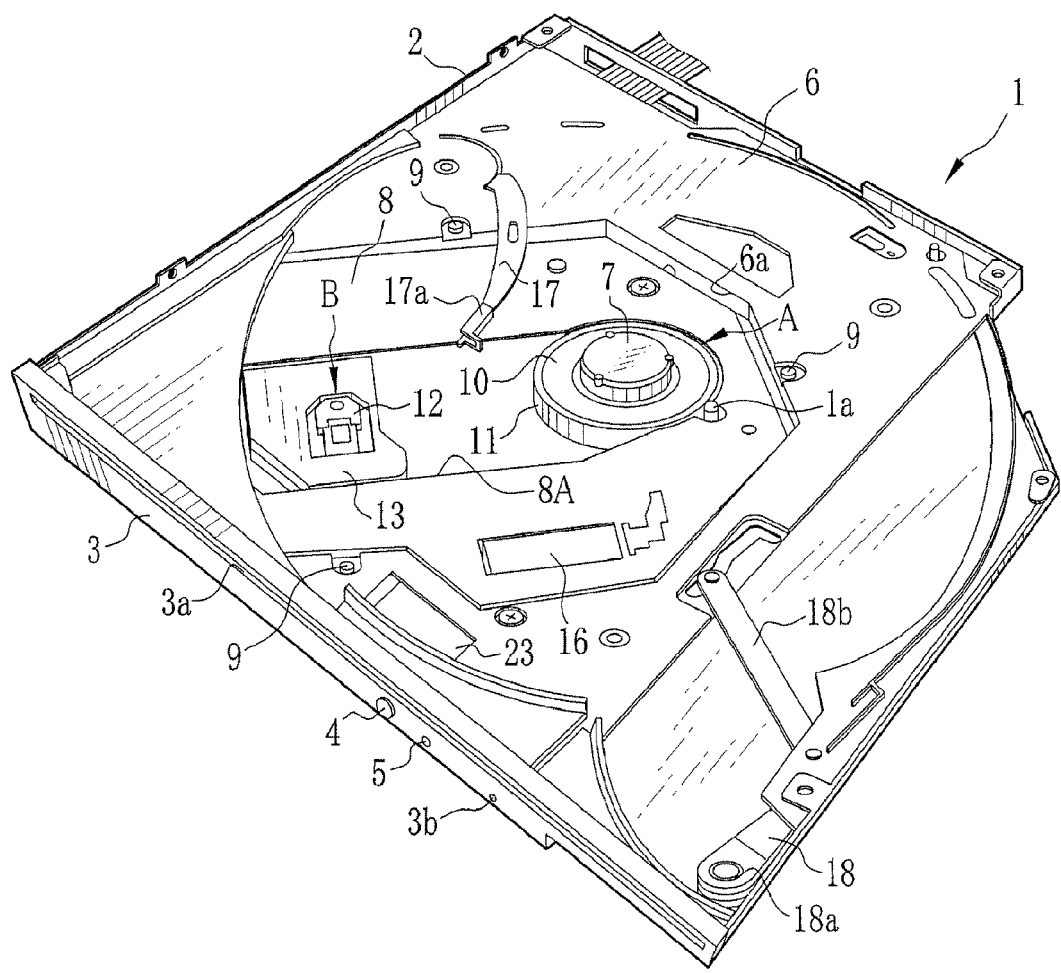
FIG. 2 is a perspective view illustrating the optical disk drive of which an upper panel is removed.
Figure 3:
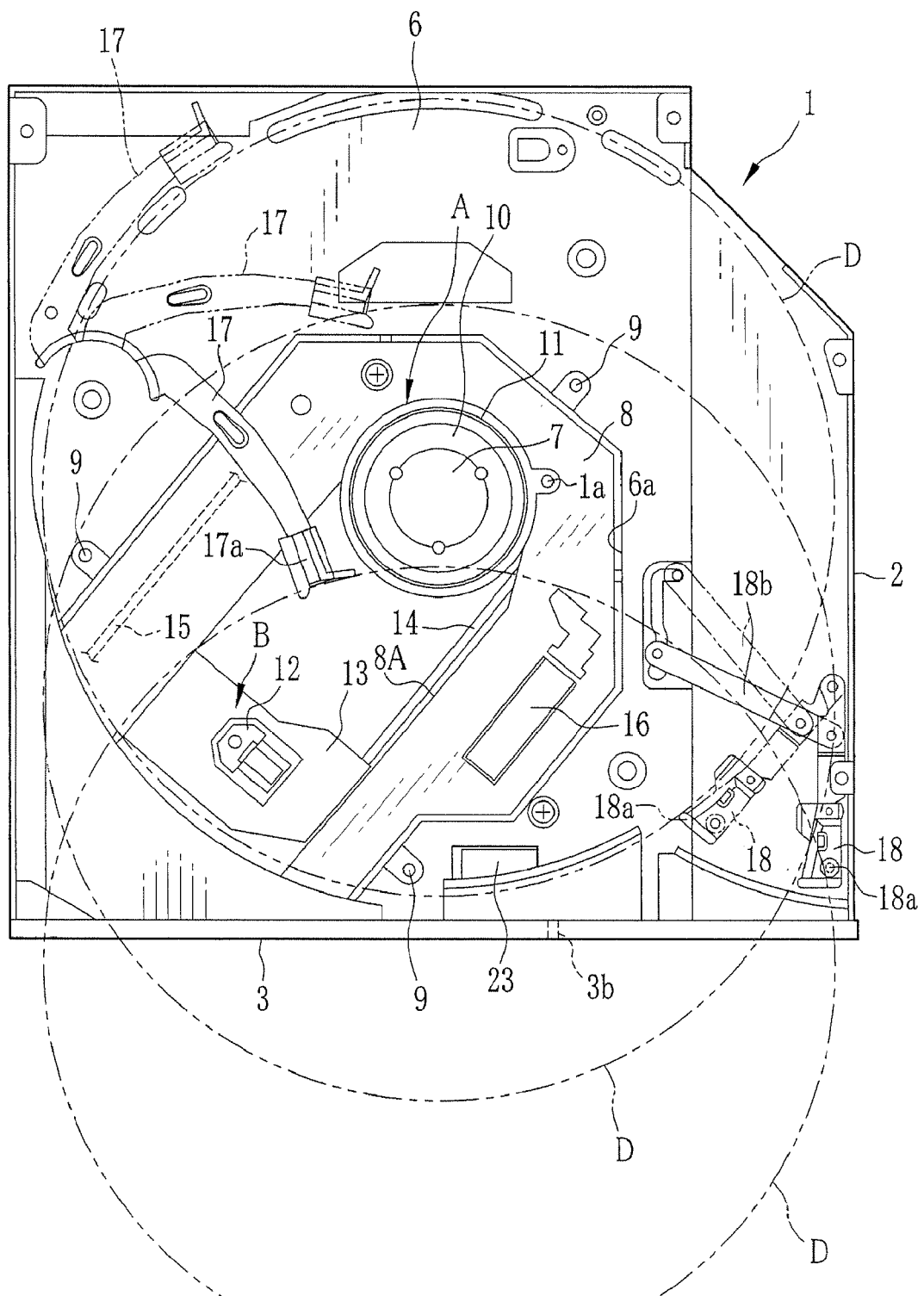
FIG. 3 is a plan illustrating the optical disk drive of which an upper panel is removed.

In FIGS. 2 and 3, a base panel 6 is fixedly secured to the case chassis 2 to split the inside of the case chassis 2 in upper and lower regions. An opening 6a is formed in the base panel 6, and extends from the center diagonally. A lifting frame 8 is disposed in the opening 6a. A cushioning support mechanism or pad 9 of a known structure is secured to the base panel 6 by fixation of plural positions. To move the optical disk D into or out of the case chassis 2, a front end of the lifting frame 8 moves pivotally up and down in the center of the optical disk drive 1 about the rotational axis at the front bezel 3. An aperture 8A is formed in the lifting frame 8, and extends from the center diagonally.

A driving unit A is supported on an end of the lifting frame 8. The driving unit A includes a spindle motor 11, a turntable 10 and a chuck head 7. The spindle motor 11 is fixed on the rear of the lifting frame 8. The turntable 10 is fixed on an output shaft of the spindle motor 11. The chuck head 7 is included in the piece of the turntable 10. When the lifting frame 8 moves up, the chuck head 7 chucks the optical disk D loaded in a chuck position. The chuck head 7 constitutes a spindle of the driving unit A. After the chucking, the spindle motor 11 rotates the optical disk D for reading or writing information. There is a release pin 1a, which comes in contact with the optical disk D when the lifting frame 8 moves down, to remove the optical disk D from the chuck head 7.

An optical pickup unit B is secured to the lifting frame 8, and includes a carriage 13 and an optical pickup head 12. The carriage 13 is positioned in the aperture 8A of the lifting frame 8. The optical pickup head 12 is supported on the carriage 13. Guide shafts 14 and 15 support the carriage 13 to move the optical pickup head 12 in the radial direction of the optical disk D. Ends of the guide shafts 14 and 15 are secured to a rear surface of the lifting frame 8. A pickup moving motor or thread motor 16 makes rotations which are transmitted by a gear train (not shown) to a screw shaft (not shown). Rotation of the screw shaft moves the carriage 13 back and forth.

A disk support arm 17 and a loading arm 18 are disposed on the base panel 6. The disk support arm 17 pivotally moves for inward and outward shift of the optical disk D. The loading arm 18 shifts the optical disk D entered in the insertion slot 3a toward the inside of the case chassis 2. The optical disk D is automatically loaded and unloaded by the disk support arm 17 and the loading arm 18. Note that plural guide arms can be disposed for contacting and guiding the optical disk D.

Figure 4:
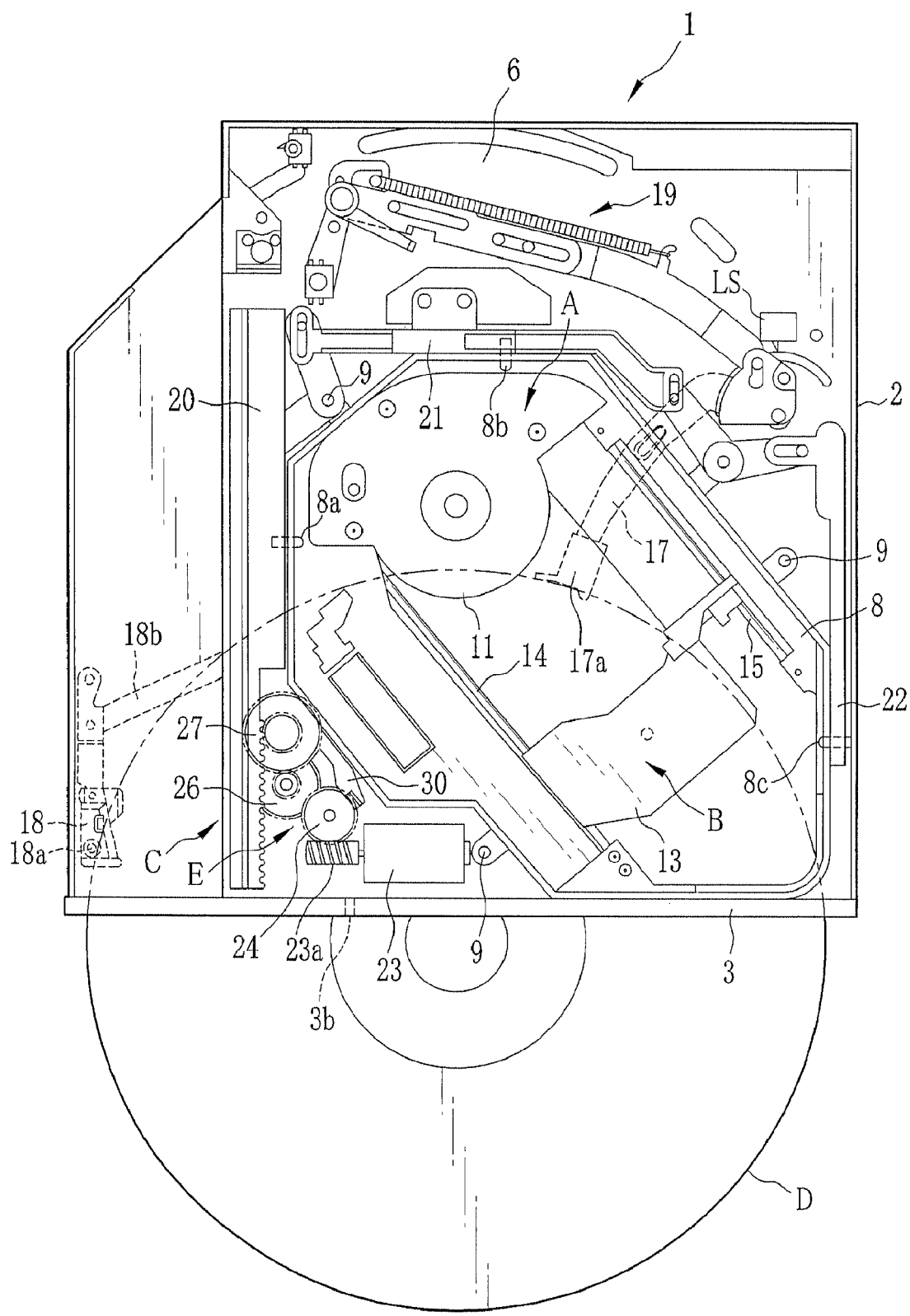
FIG. 4 is a bottom plan illustrating the optical disk drive of which a lower panel of the case chassis is removed and in which an optical disk is being entered.
Figure 5:
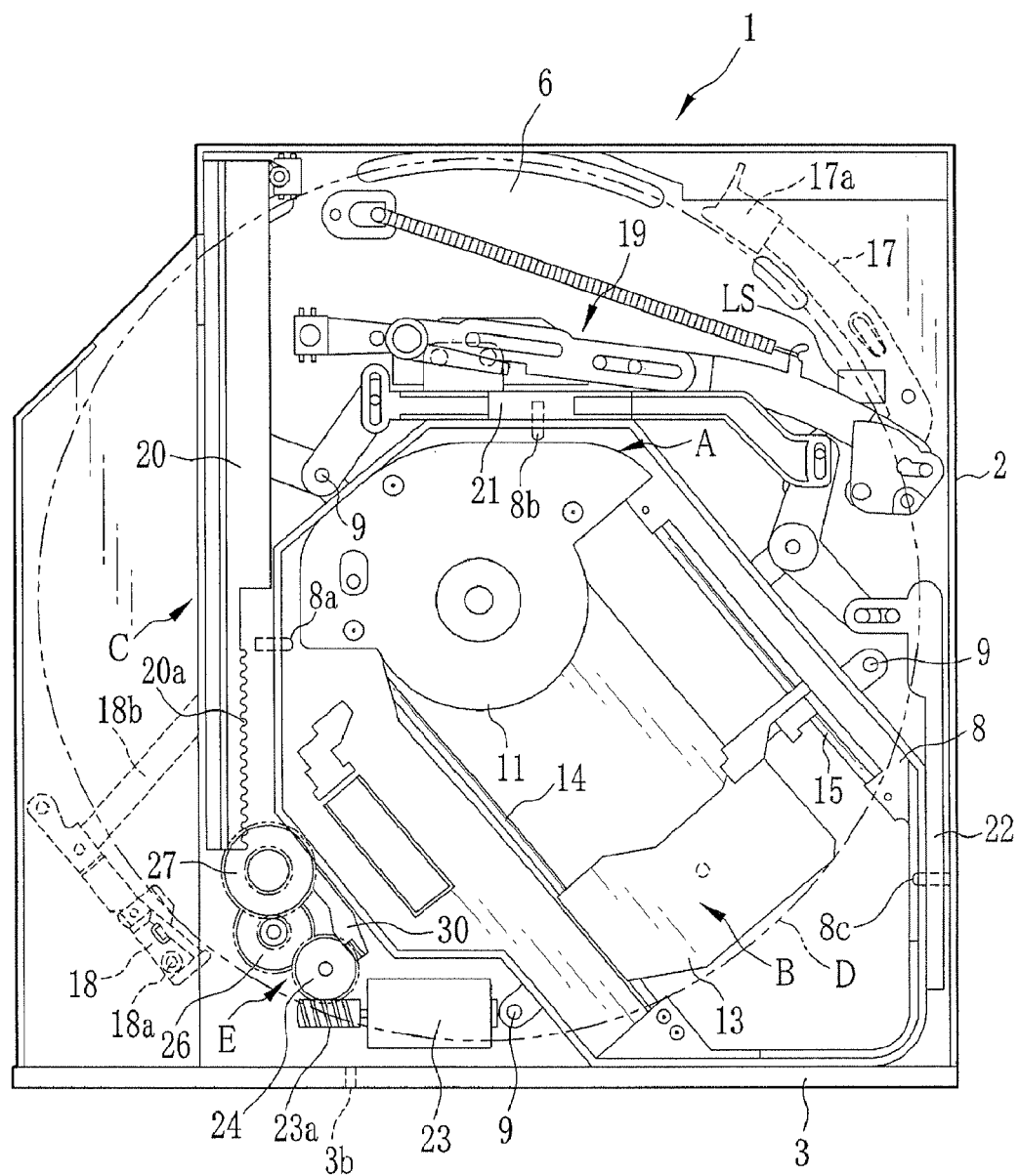
FIG. 5 is a bottom plan illustrating the same as FIG. 4 but after loading of the optical disk.

In FIGS. 4 and 5, a loading motor 23 is disposed behind the base panel 6. Rotation of the loading motor 23 is transmitted by a transmission gear mechanism E to the disk transport mechanism C, for loading and unloading of the optical disk D. A loading slider 20 is included in the disk transport mechanism C as well as the disk support arm 17 and the loading arm 18. A link mechanism 19 connects the loading arm 18 with the disk support arm 17 in a linked manner.

Figure 6:
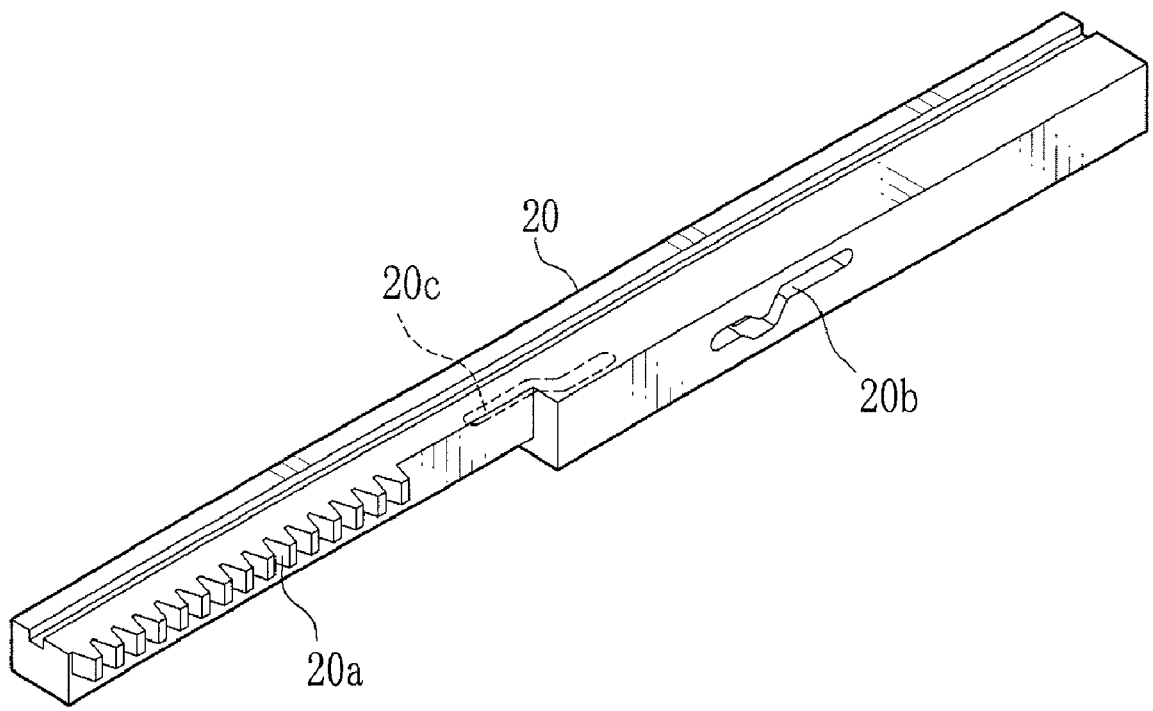
FIG. 6 is a perspective view illustrating a loading slider.

The loading slider 20 moves forwards and backwards along the surface of the case chassis 2. In FIG. 6, a rack gear 20a is formed on an edge of the loading slider 20. A cam groove 20b is formed in the loading slider 20. A follower pin 8a is associated with the cam groove 20b, and causes the lifting frame 8 to move upon the shift with the cam groove 20b. A cam groove 20c is formed in the loading slider 20. A link lever 18b is associated with the cam groove 20c, and moves the loading arm 18 pivotally upon the shift with the cam groove 20c.

When the optical disk D is entered in the insertion slot 3a of the front bezel 3 as illustrated in FIG. 3, a distal end portion of the optical disk D in the insertion direction comes to contact a channel formed holder 17a at an end of the disk support arm 17. Further advance of the optical disk D moves the disk support arm 17 pivotally in the counterclockwise direction in contact with the optical disk D, to shift the limit switch LS of FIG. 4. The loading motor 23 starts rotation in response to an output of the limit switch LS. Rotation of the loading motor 23 is transmitted by the transmission gear mechanism E to the loading slider 20.

The loading slider 20 is moved by the loading motor 23 in the forward direction or away from the front bezel 3. The loading arm 18 is moved pivotally by cooperation of the cam groove 20c and the link lever 18b. A loading roller 18a at the end of the loading arm 18 presses a proximal end portion of the optical disk D, and enters the optical disk D into the case chassis 2. The channel formed holder 17a of the disk support arm 17 swings in supporting the distal end portion of the optical disk D.

In FIG. 5, the optical disk D moves to the chuck position, to set a center hole of the optical disk D at the chuck head 7. Then the lifting frame 8 is shifted up by the loading slider 20, to chuck the optical disk D on the chuck head 7 by entry in the center hole. To move up and down the lifting frame 8, the follower pin 8a and follower pins 8b and 8c of the lifting frame 8 are guided and shifted by cam grooves respectively formed in the loading slider 20 and sliders 21 and 22 linked with the loading slider 20.

To eject the optical disk D from the case chassis 2, the ejection button 4 on the front bezel 3 is depressed. Otherwise, the disk transport mechanism C is driven in a direction reverse to the loading, in response to an instruction signal from an external electronic device. At first, the loading motor 23 starts rotating backwards, to move the loading slider 20 toward the front bezel 3 or in the backward direction. In response, the disk support arm 17 moves pivotally toward the center or clockwise in FIG. 2, to move the optical disk D to the ejection position of FIG. 4.

When the loading slider 20 moves forwards and backwards, various elements including the cam mechanism and link mechanism cause the loading arm 18 and the disk support arm 17 to swing, and cause the lifting frame 8 to move up and down. Details of the cam mechanism and link mechanism are described in U.S. Pat. Pub. No. 2006/0230412.

Figure 7:
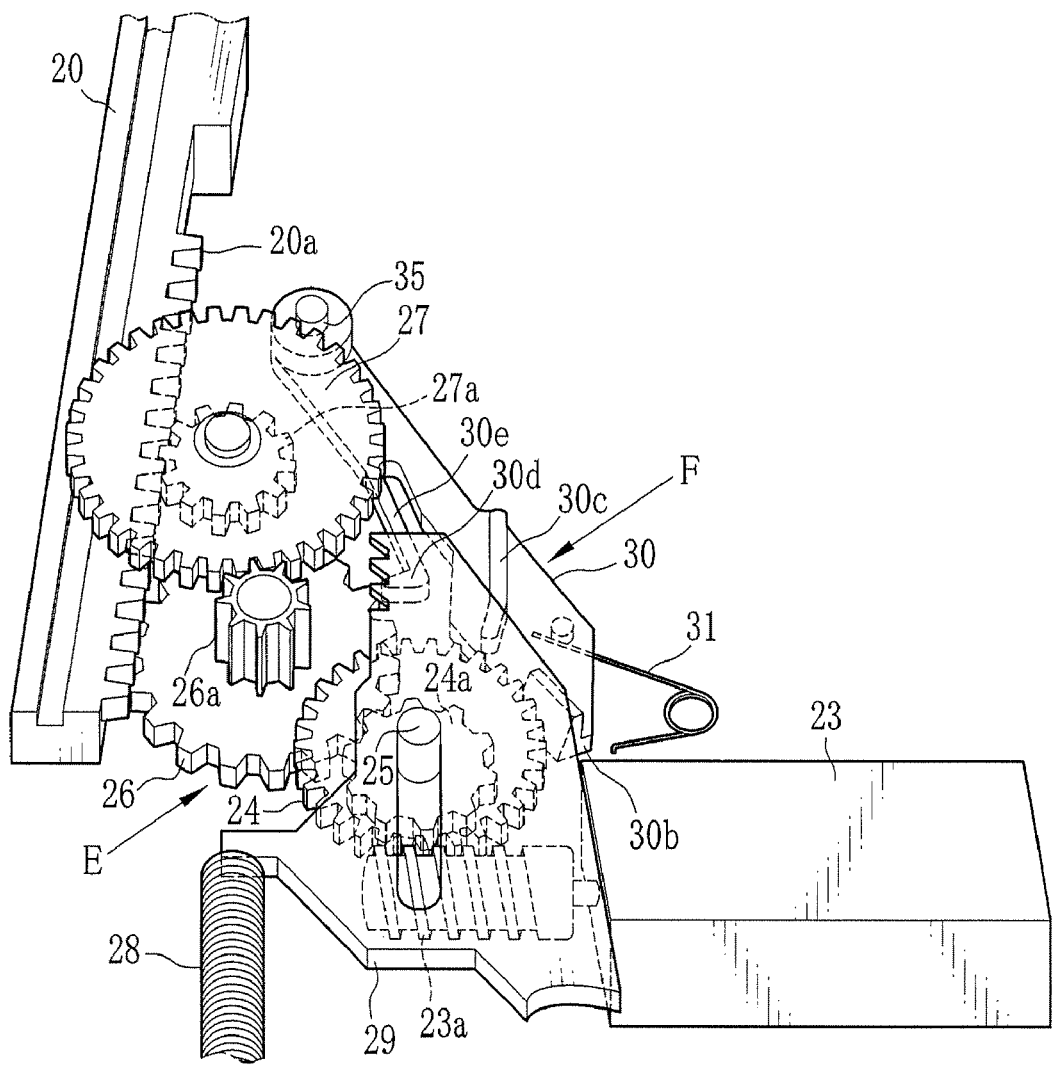
FIG. 7 is a perspective view illustrating a transmission gear mechanism and an emergency disk ejector as viewed from a lower side.

The transmission gear mechanism E and an emergency disk ejector or specific disk ejector F are described now. In FIG. 7, the transmission gear mechanism E is a gear train, is disposed between the loading motor 23 and the loading slider 20. Force of rotation of the loading motor 23 is transmitted to the loading slider 20 to move the loading slider 20 forwards and backwards. A worm gear 23a is secured to an output shaft of the loading motor 23. A first gear wheel 24 of a compound gear is meshed with the worm gear 23a. A small wheel 24a is an upper portion of the compound gear having the first gear wheel 24. A guide pin or spindle pin 25 is disposed to project from the base panel 6 or the case chassis 2. The first gear wheel 24 receives insertion of the guide pin 25, and is kept slidable up and down.

A transmission wheel 26 of a compound gear is meshed with the small wheel 24a on the first gear wheel 24. A small wheel 26a is included in the compound gear of the transmission wheel 26 as one piece. A second gear wheel or driving gear wheel 27 of a compound gear is meshed with the small wheel 26a. A small wheel 27a is included in the compound gear of the driving gear wheel 27 as one piece, and is meshed with the rack gear 20a of the loading slider 20. Force of rotation of the loading motor 23 is transmitted to the rack gear 20a by the worm gear 23a, the first gear wheel 24, the small wheel 24a, the transmission wheel 26, the small wheel 26a, the driving gear wheel 27 and the small wheel 27a, so as to move forwards and backwards the loading slider 20.

Figure 14:
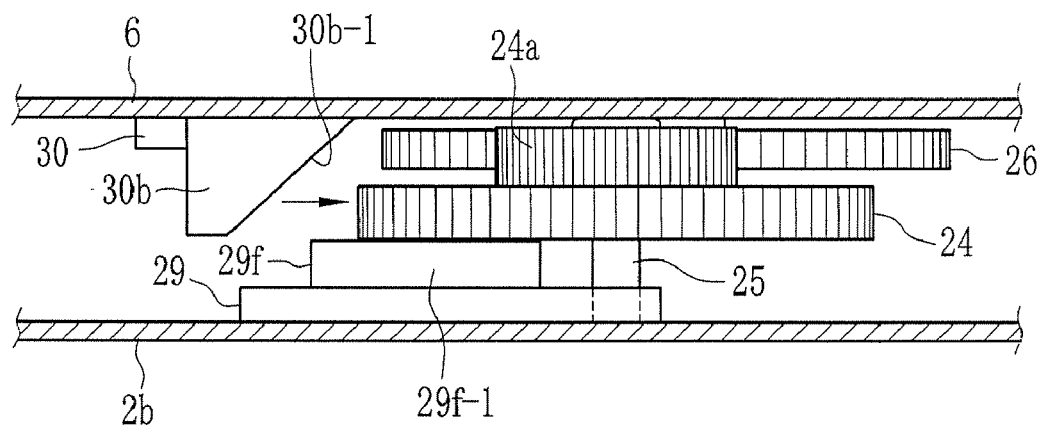
FIGS. 14 and 15 are side elevations illustrating operation of the driving lever and the anti-reverse lever.

An emergency disk ejector or specific disk ejector F is disposed for manually ejecting an optical disk D in particular for the emergency of failure of the loading motor 23, for example due to breakage, disconnection from the power source, or shortage of power of a battery. The emergency disk ejector F includes a driving lever 29 as driving structure, and an anti-reverse lever 30 as follower. In FIG. 14, a step portion or large thickness portion 29f of the driving lever 29 is oriented upwards. The driving lever 29 is disposed under the transmission gear mechanism E, and movable on a lower wall 2b of the case chassis 2. A tension coil spring 28 biases the driving lever 29 toward the front bezel 3. The anti-reverse lever 30 is disposed under the base panel 6 and beside the transmission gear mechanism E. The anti-reverse lever 30 has a ridge 30c, which is oriented downwards. A pivot pin 35 projects from the base panel 6, and is inserted in a through hole 30a to support the anti-reverse lever 30 in a pivotally movable manner. A torsion coil spring 31 biases the anti-reverse lever 30 in the counterclockwise direction. Note that the torsion coil spring 31 has a smaller force of bias than that of the tension coil spring 28. In FIGS. 4 and 5, the emergency disk ejector F is not depicted.

Figure 8A:
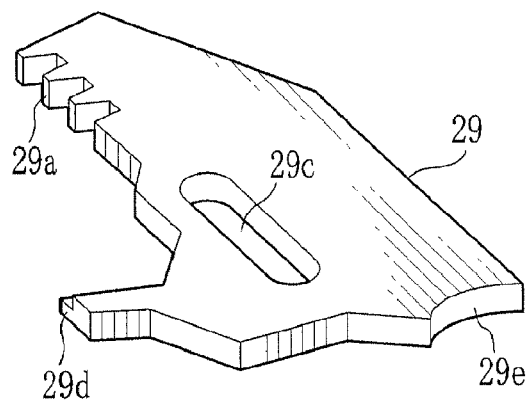
FIG. 8A is a perspective view illustrating a driving lever as viewed from a lower side.
Figure 8B:
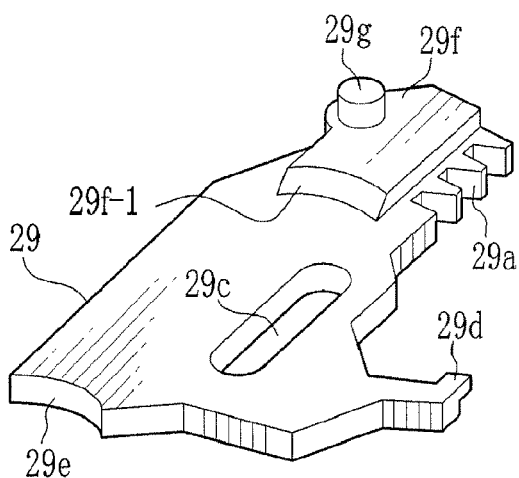
FIG. 8B is a perspective view illustrating the driving lever as viewed from an upper side.

In FIGS. 8A and 8B, a rack gear 29a is formed with a front end of the driving lever 29 for mesh with the driving gear wheel 27. A slot 29c is formed in the driving lever 29 for receiving the guide pin or spindle pin 25. Teeth of the rack gear 29a have an erect tooth surface and a tilted tooth surface, and are shaped like saw teeth. When the driving lever 29 moves forwards, the erect tooth surface of the rack gear 29a contacts a tooth surface of the driving gear wheel 27. The mesh between the rack gear 29a and the driving gear wheel 27 can be maintained reliably. If the driving lever 29 moves backwards, the tilted tooth surface of the rack gear 29a contacts the tooth surface of the driving gear wheel 27. The rack gear 29a can become separated from the driving gear wheel 27 smoothly. A hook 29d projects from a side of the driving lever 29 for retention of the tension coil spring 28. A receiving end 29e of the driving lever 29 receives the emergency pin P as external device. In a normal state, the step portion 29f receives a lower surface of the first gear wheel 24, and positions the first gear wheel 24 for mesh of the small wheel 24a with the transmission wheel 26. When the driving lever 29 moves forwards, the step portion 29f is disengaged from the lower surface of the first gear wheel 24. The first gear wheel 24 shifts down and becomes received on the driving lever 29. The small wheel 24a in this state is not meshed with the transmission wheel 26. A tilted surface 29f-1 is formed with the step portion 29f for facilitating entry under the first gear wheel 24. A projection 29g is formed with the step portion 29f for pivotally moving the anti-reverse lever 30.

Figure 9:
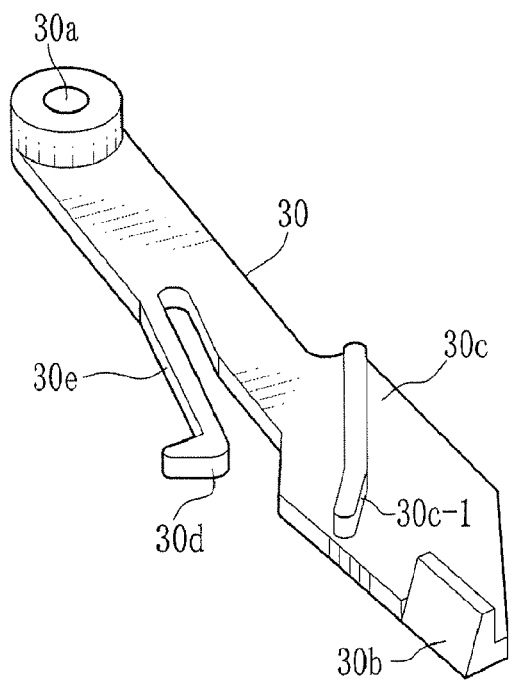
FIG. 9 is a perspective view illustrating a follower or anti-reverse lever as viewed from a lower side.

In FIG. 9, the through hole 30a is formed at the rear end of the anti-reverse lever 30, and receives insertion of the pivot pin 35. A wedge block or wedge projection 30b is formed at a front end of the anti-reverse lever 30, and pushes down the first gear wheel 24 when the step portion or large thickness portion 29f is shifted away from the lower surface of the first gear wheel 24. The ridge 30c is positioned for being depressed by the projection 29g of the driving lever 29.

A latch arm 30e is formed to project from a side of the anti-reverse lever 30. A latch claw 30d is an end of the latch arm 30e. When the anti-reverse lever 30 rotates clockwise and moves to a latched position, the latch claw 30d enters a region between two teeth of the transmission wheel 26, to latch the transmission wheel 26. When the anti-reverse lever 30 rotates counterclockwise and moves to a released position, the latch claw 30d moves away from teeth of the transmission wheel 26 to unlatch the transmission wheel 26.

When the transmission wheel 26 stands latched, the latch arm 30e is curved during rotation of the transmission wheel 26 in the clockwise direction. The latch claw 30d moves away from teeth of the transmission wheel 26. Thus, the transmission wheel 26 is not locked. In contrast, in rotation of the transmission wheel 26 in the counterclockwise direction, the latch claw 30d is firmly meshed with teeth of the transmission wheel 26. Thus, the transmission wheel 26 is locked and stopped from rotating in the counterclockwise direction.

Figure 10:
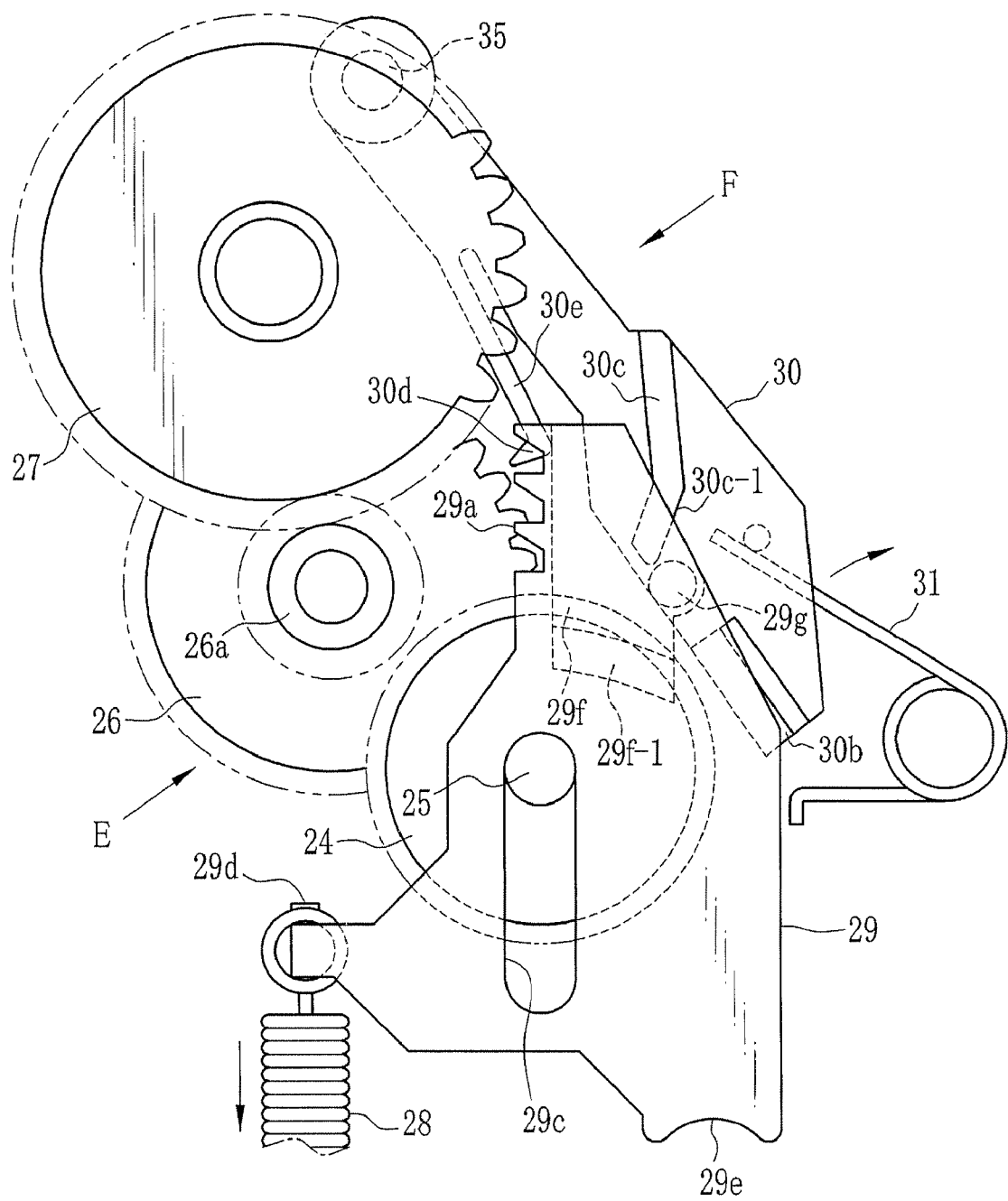
FIGS. 10, 11, 12 and 13 are bottom plans illustrating steps of movement of the emergency disk ejector.

The operation of the above embodiment is described by referring to FIGS. 10-15. In FIG. 10, the driving lever 29 as driving structure in the normal state is biased by the tension coil spring 28 toward the front bezel 3, and is set in the initial position on the guide pin or spindle pin 25. In FIG. 14, the step portion or large thickness portion 29f of the driving lever 29 supports the first gear wheel 24, so that the small wheel 24a is meshed with the transmission wheel 26. The latch claw 30d is in the released position and disposed away from teeth of the transmission wheel 26, as the anti-reverse lever 30 as follower is biased by the torsion coil spring 31.

Rotation of the loading motor 23 is transmitted by the transmission gear mechanism E to the rack gear 20a. The loading slider 20 is moved forwards or backwards by forward and backward rotation of the loading motor 23, for loading and unloading of the optical disk D.

An accidental failure of the loading motor 23 may occur during operation of the optical disk drive 1, because of breakage, disconnection from the power source, or shortage of power of a battery. When a user finds this abnormality, he or she inserts an emergency pin P as external device through the emergency hole 3b, and pushes the driving lever 29 of FIG. 11. The driving lever 29 moves forwards and also rotates in the counterclockwise direction slightly about the guide pin or spindle pin 25 so as to direct the rack gear 29a toward the driving gear wheel 27 or second gear wheel. The advance of the driving lever 29 moves the step portion 29f away from the lower surface of the first gear wheel 24. The first gear wheel 24 becomes ready to shift down by its weight along the guide pin 25.

While the driving lever 29 moves, a tilted region 30c-1 of the ridge 30c of the anti-reverse lever 30 is pressed by the projection 29g. The anti-reverse lever 30 rotates clockwise against the torsion coil spring 31, and moves to the latched position. Upon the reach to the latched position of the anti-reverse lever 30, the latch claw 30d at the end of the latch arm 30e becomes meshed with the transmission wheel 26, to latch the transmission wheel 26. In the latched state, the transmission wheel 26 is stopped from rotating in the counterclockwise direction.

Figure 15:
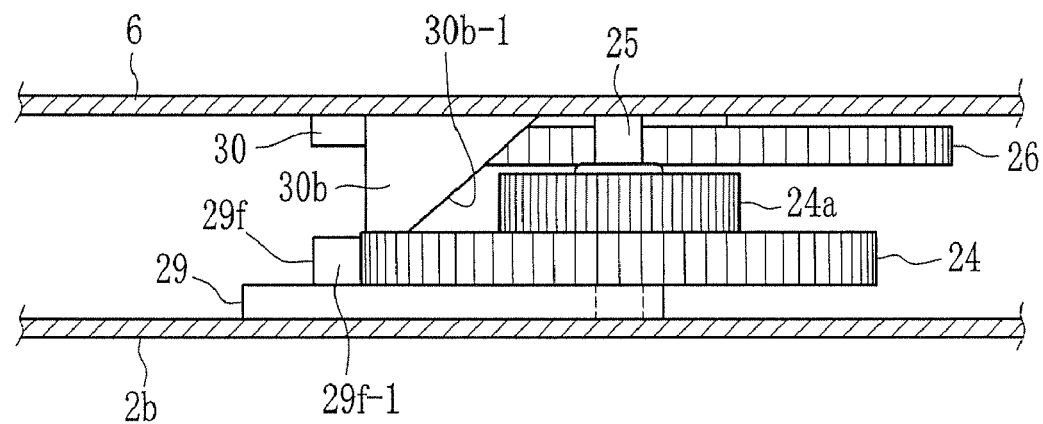
Figure 16:
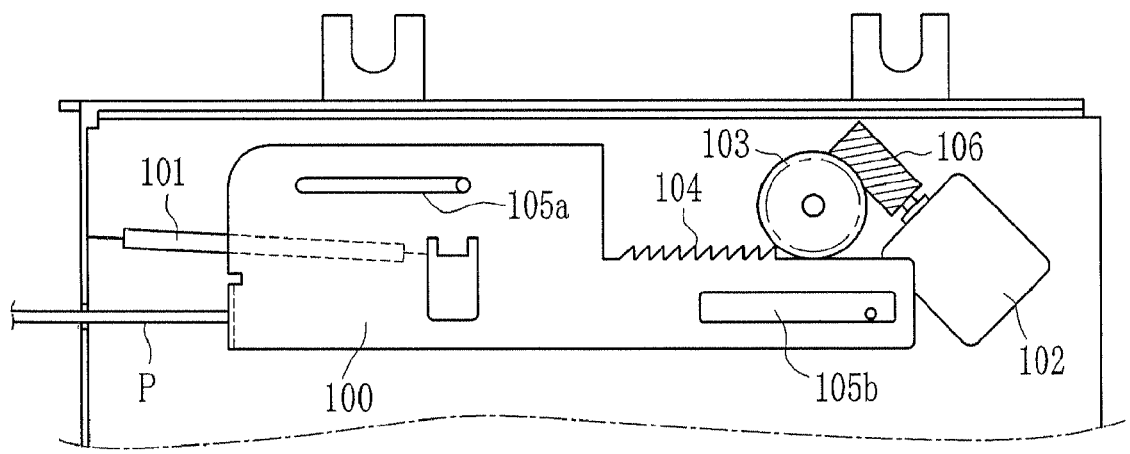
FIG. 16 is a plan illustrating a known structure of the emergency disk ejector.

In FIG. 15, a tilted surface 30b-1 of the wedge block 30b of the anti-reverse lever 30 comes to an upper surface of the first gearwheel 24 when or after the step portion or large thickness portion 29f comes away from the lower surface of the first gear wheel 24. The first gear wheel 24 is pressed down to a level received by the driving lever 29. Thus, the first gear wheel 24 is reliably pressed down by the wedge block 30b even if the first gear wheel 24 is not shifted by its weight. The first gear wheel 24 shifts on the worm gear in the state kept in the mesh. Note that the shifting of the first gear wheel 24 may be at the same time of the latch of the transmission wheel 26, or before or after the latch.

Figure 11:
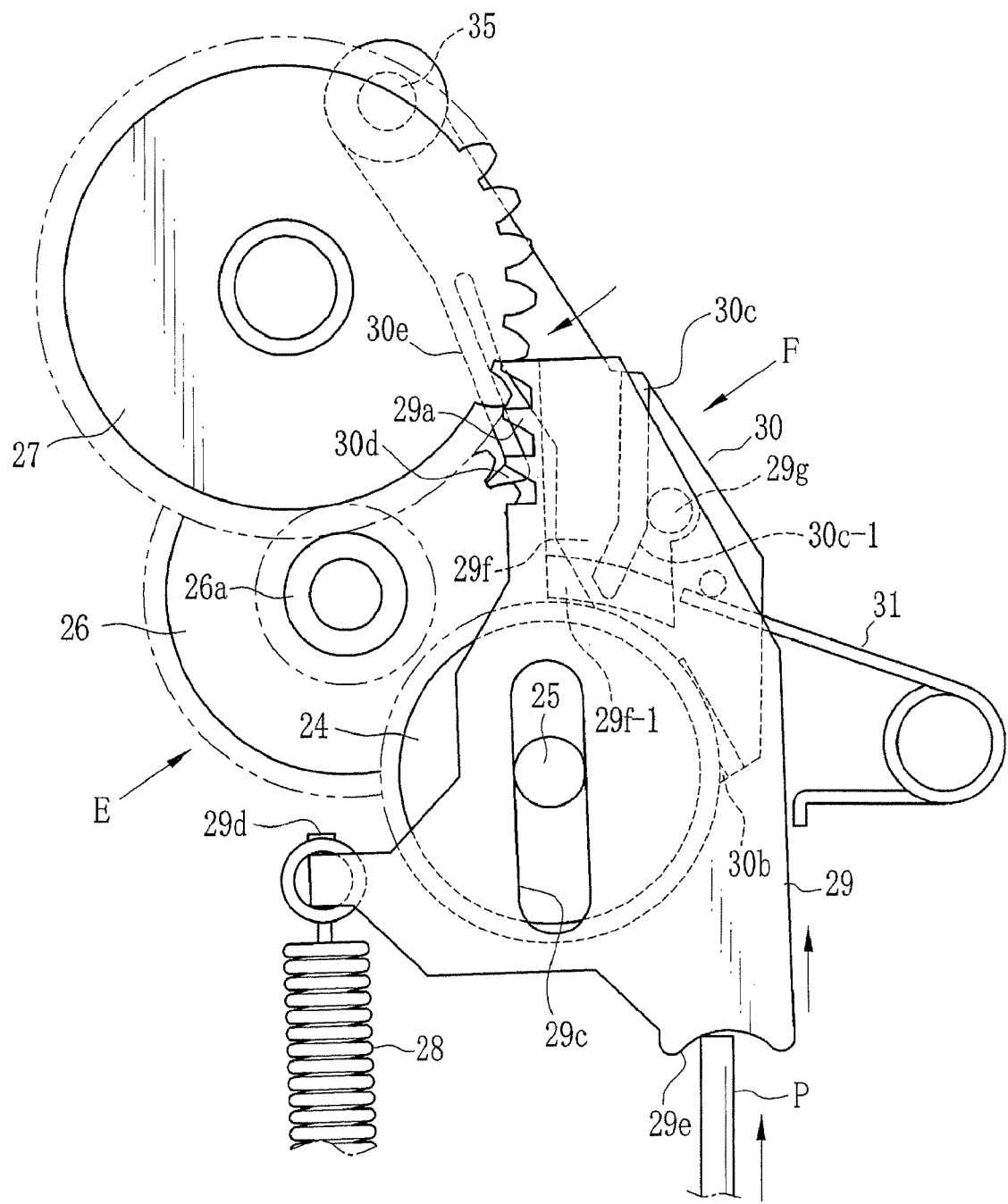

The shifting of the first gear wheel 24 and the latch of the transmission wheel 26 are carried out while the driving lever 29 moves from a first position of FIG. 10 to a second position or intermediate position of FIG. 11 where the projection 29g passes the tilted region 30c-1. As the first gear wheel 24 shifts by a distance according to the thickness of the step portion 29f, the small wheel 24a shifts from a meshed position with the transmission wheel 26 to a disengaged position. Upon the reach of the small wheel 24a to the disengaged position, the small wheel 24a is disengaged from the transmission wheel 26. Separation of the transmission gear mechanism E occurs into the component on the side of the loading motor and the component on the side of the disk transport mechanism. Gear wheels on the side of the disk transport mechanism in the embodiment are the transmission wheel 26, the small wheel 26a, the driving gear wheel 27 and the small wheel 27a.

Figure 12:
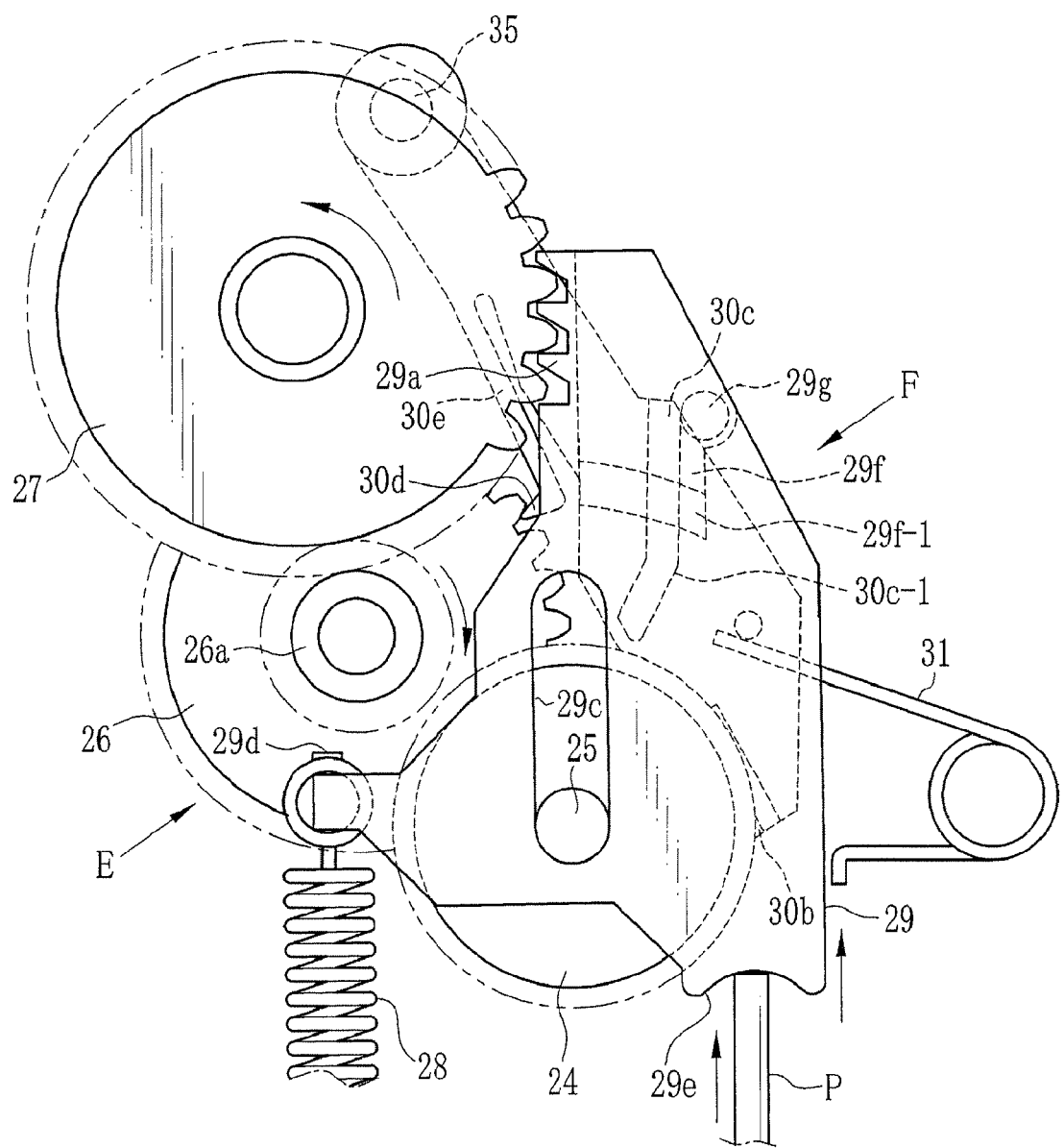

The emergency pin P is pushed more deeply, to move the driving lever 29 forward from the intermediate position of FIG. 11 to a final position of FIG. 12. The rack gear 29a of the driving lever 29 moved forwards becomes meshed with the driving gear wheel 27, which rotates in the counterclockwise direction of the arrow. The small wheel 27a rotates together with the driving gear wheel 27. The loading slider 20, of which the rack gear 20a is meshed with the small wheel 27a, moves toward the front bezel 3. In response, the disk support arm 17 and other moving elements pivotally move in a manner for moving out the optical disk D, to move the optical disk D toward the front bezel 3.

While the driving lever 29 moves from the intermediate position to the final position, the straight portion of the ridge 30c of the anti-reverse lever 30 is parallel to the moving direction of the projection 29g. The anti-reverse lever 30 is in the latched position. The transmission wheel 26 is kept latched by the latch claw 30d. However, the transmission wheel 26 is caused to rotate clockwise by rotation of the driving gear wheel 27 in the arrow direction. The latch arm 30e is bent with a curve to shift the latch claw 30d away from teeth of the transmission wheel 26. Accordingly, the driving gear wheel 27 can rotate safely in the arrow direction without being blocked by the latch claw 30d with the transmission wheel 26.

Figure 13:
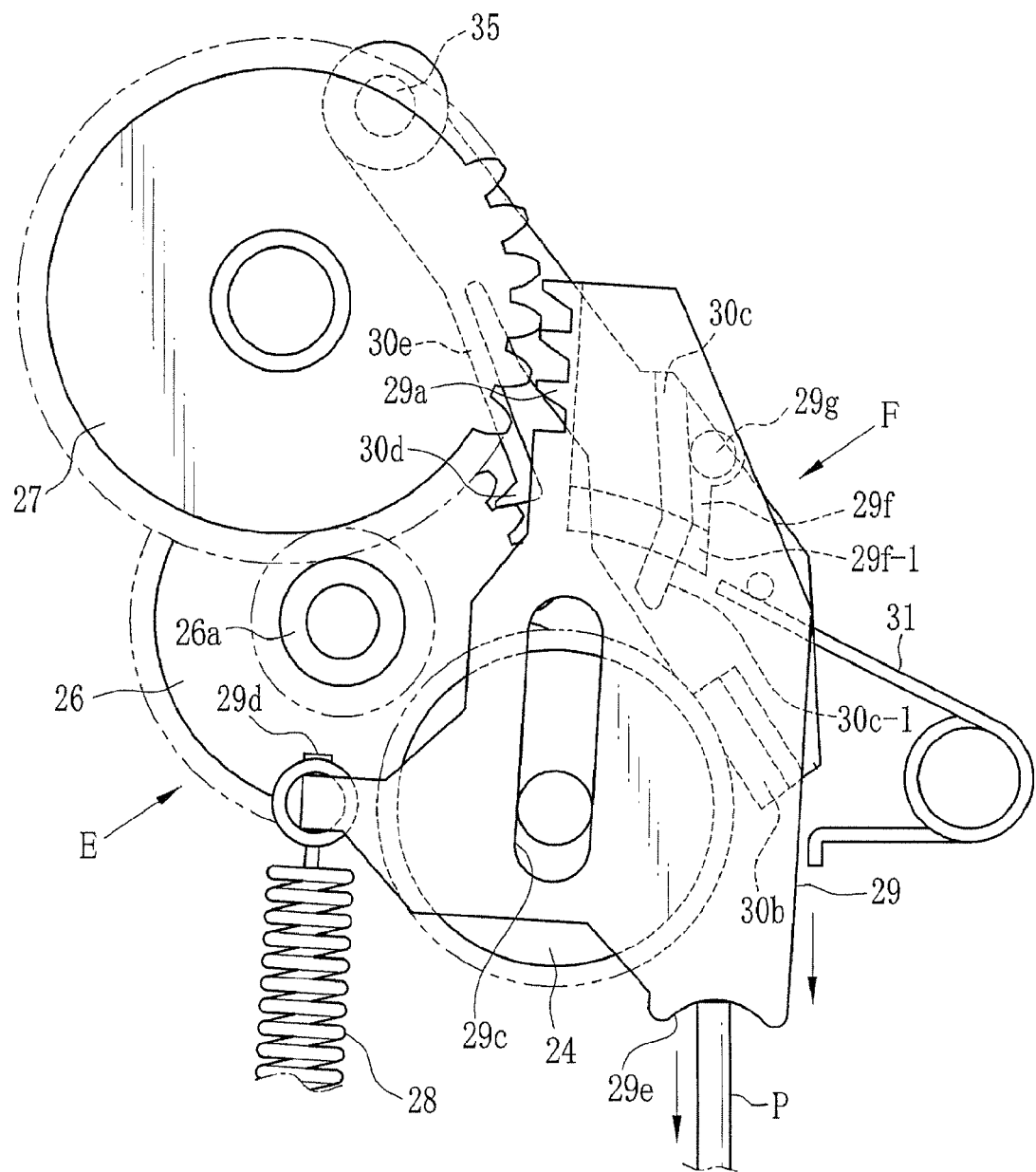

When the push of the emergency pin P as external device discontinues, the driving lever 29 is moved back as illustrated in FIG. 13 by the force of the tension coil spring 28. Although the rack gear 29a is in mesh with the driving gear wheel 27 for clockwise rotation during the backward movement of the driving lever 29, the driving gear wheel 27 does not rotate, because the latch claw 30d blocks rotation of the transmission wheel 26 in the counterclockwise direction. A tilted tooth surface of the rack gear 29a contacts the teeth of the driving gear wheel 27, so that the force applied to the driving gear wheel 27 is small. Disengagement of the rack gear 29a from the driving gear wheel 27 is facilitated. The driving lever 29 moves back while the rack gear 29a moves to pass tooth tips of the driving gear wheel 27. As the removal of the rack gear 29a from the driving gear wheel 27 is easy, the force of the tension coil spring 28 for moving back the driving lever 29 can be set small. There is another advantage in that manual touch for the emergency pin P for push can be very light.

The tilted region 30c-1 of the anti-reverse lever 30 becomes positioned at the projection 29g while the driving lever 29 moves back from the intermediate position of FIG. 11 to the initial position of FIG. 10. The anti-reverse lever 30 is rotated counterclockwise by the torsion coil spring 31, to move from the latched position to the released position. Thus, the transmission wheel 26 is unlatched. The wedge block or wedge projection 30b of the anti-reverse lever 30 moves away from the upper surface of the first gear wheel 24.

As the driving lever 29 moves back, the tilted surface 29f-1 of the step portion 29f comes to the lower surface of the first gear wheel 24 in a wedge state. The first gear wheel 24 shifts from the position of FIG. 15 to the position of FIG. 14. The small wheel 24a comes from the disengaged position to the meshed position and becomes meshed with the transmission wheel 26.

Again, the emergency pin P as external device is entered for push. The driving gear wheel 27 is caused to rotate as described above. The emergency pin P is pushed for plural times, to move forwards the optical disk D toward the front bezel 3 in a stepwise manner. The optical disk D is moved out to the ejection position through the insertion slot 3a. Even if the optical disk D rotates during the emergency ejection, the optical disk D is stopped from rotating during the period of repeated push of the emergency pin P.

In the above embodiment, the small wheel 24a is combined in the first gear wheel 24 as one compound gear. The step portion or large thickness portion 29f of the driving lever 29 causes the first gear wheel 24 to shift the small wheel 24a indirectly. If the small wheel 24a is an element separate from the first gear wheel 24, the step portion 29f drives the small wheel 24a to shift directly.

Furthermore, the loading slider 20 may not be used. A transmission gear mechanism can be used directly to rotate the disk support arm 17 and the loading arm 18. Also, a first one of the disk support arm 17 and the loading arm 18 may be rotated by the transmission gear mechanism. A second one of the disk support arm 17 and the loading arm 18 may be moved by linking with a link mechanism.

Also, an optical disk drive of the invention may be a tray type in place of the slot-in type. A disk moving mechanism of the tray type is constituted by a rack gear and a tray. The rack gear is moved by the transmission gear mechanism. The tray is secured to the rack gear. The push of an emergency pin moves the tray from inside the case chassis 2, the tray being loaded with the optical disk. Therefore, an optical disk drive of the invention may be any type in which an optical disk is moved in or out upon forward or backward rotation of the loading motor 23.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk device having a disk transport mechanism for loading of a disk and moving said disk to a chuck position when a loading motor rotates forwards, and for unloading and moving said disk to an ejection position when said loading motor rotates backwards, said disk device comprising:
a transmission gear mechanism for transmitting rotation of said loading motor to said disk transport mechanism, said transmission gear mechanism including plural gear wheels; and
a specific disk ejector, operated by push of an external device, for separating said transmission gear mechanism into a first component on a disk transport mechanism side and a second component on a side of said loading motor by shifting a first gear wheel of said transmission gear mechanism from a meshed position to a disengaged position, and for rotating a second gear wheel of said transmission gear mechanism included in said first component on said disk transport mechanism side in a first direction, to actuate said disk transport mechanism for unloading said disk.

2. A disk device as defined in claim 1, wherein said specific disk ejector shifts said first gear wheel to said disengaged position in an initial step of said push of said external device, and then causes said second gear wheel to rotate at a predetermined amount.

3. A disk device as defined in claim 2, wherein said specific disk ejector actuates said disk transport mechanism intermittently by said push of said external device at plural times, to move back said disk to said ejection position.

4. A disk device as defined in claim 3, further comprising a biasing member for moving said specific disk ejector to an initial position when said push of said external device discontinues.

5. A disk device as defined in claim 4, wherein said specific disk ejector further prevents said second gear wheel from rotating in a second direction reverse to said first direction in moving back to said initial position.

6. A disk device as defined in claim 5, wherein prevention of said second gear wheel from rotating in said second direction is substantially simultaneous with shift of said first gear wheel to said disengaged position.

7. A disk device as defined in claim 5, wherein said disk transport mechanism includes:
   a loading slider moved back and forth substantially rectilinearly by said transmission gear mechanism;
   plural arms for supporting said disk, for moving pivotally, for moving said disk to said chuck position when said loading slider moves forwards, and for moving said disk back to said ejection position when said loading slider moves backwards.

8. A disk device as defined in claim 1, wherein said specific disk ejector includes a driving structure for moving from a first position to a third position by passing a second position upon said push of said external device, and a first biasing member for biasing said driving structure toward said first position;
   said driving structure includes:
   a step portion for shifting said first gear wheel between said meshed position and said disengaged position, for keeping said first gear wheel in said meshed position when said driving structure is in said first position, and for releasing and allowing said first gear wheel to shift to said disengaged position while said driving structure moves from said first position to said second position;
   a rack gear, engageable with said second gear wheel, for mesh with said second gear wheel to rotate said second gear wheel in said first direction when said driving structure moves from said second position to said third position, and for disengagement from said second gear wheel when said driving structure moves back from said third position to said second position.

9. A disk device as defined in claim 8, wherein said step portion includes a tilted surface for shifting said first gear wheel gradually to said meshed position when said driving structure moves back from said second position to said first position.

10. A disk device as defined in claim 9, wherein said driving structure further includes a slot for receiving insertion of a stationary pin, said slot keeps said driving structure movable between said first and third positions, and keeps said driving structure pivotally movable for releasing said rack gear from mesh with said second gear wheel in moving back from said third position to said second position.

11. A disk device as defined in claim 10, wherein each of teeth of said rack gear includes:
   a first tooth surface, being erect, for rotating said second gear wheel in said first direction when said driving structure moves from said second position to said third position; and
   a second tooth surface, being tilted, for facilitating passage of a tooth tip of said second gear wheel when said driving structure moves back from said third position to said second position.

12. A disk device as defined in claim 8, wherein said specific disk ejector further includes:
   a follower, driven by said driving structure to move between a latched position and a released position, for moving to said latched position while said driving structure moves from said first position to said second position, and for moving to said released position while said driving structure moves back from said second position to said first position, wherein said follower, when in said latched position, allows said second gear wheel to rotate in said first direction, and disables said second gear wheel from rotating in said second direction;
   a second biasing member for biasing said follower toward said released position, said second biasing member having smaller force of bias than said first biasing member.

13. A disk device as defined in claim 12, wherein said follower further includes:
   a latch arm having resiliency; and
   a latch claw, formed at an end of said latch arm, for engagement with a tooth of a third gear wheel included in said first component on said disk transport mechanism side when in said latched position, wherein said latch claw, when said second gear wheel rotates in said first direction, is moved away from said tooth of said third gear wheel by resilient deformation of said latch arm, and when rotational force to said second gear wheel is exerted in said second direction, comes in mesh with said third gear wheel.

14. A disk device as defined in claim 13, wherein said follower further includes a wedge block for pressing and shifting said first gear wheel to said disengaged position in a state free from said step portion of said driving structure when said follower moves from said released position to said latched position.

15. A disk device as defined in claim 14, wherein said driving structure includes a projection, and said follower has a ridge pressed by said projection, and said follower is caused by said projection and said ridge to move between said latched position and said released position upon movement of said driving structure.

16. A disk device having a disk transport mechanism for loading of a disk and moving said disk to a chuck position when a loading motor rotates forwards, and for unloading and moving said disk to an ejection position when said loading motor rotates backwards, said disk device comprising:
   a transmission gear mechanism for transmitting rotation of said loading motor to said disk transport mechanism by constituting a transmission system, and
   a specific disk ejector, operated by push of an external device to a first position for separating said transmission system into a first component on a disk transport mechanism side and a second component on a side of said loading motor, and pushed more deeply from the first position to drive said first component to actuate said disk transport mechanism for unloading said disk.

* * * * *